United States Patent
Abdel-Rahman et al.

(10) Patent No.: US 12,126,257 B2
(45) Date of Patent: Oct. 22, 2024

(54) POWER FACTOR CORRECTION STAGE, CONTROLLER AND METHOD OF CONTROLLING A POWER FACTOR CORRECTION STAGE

(71) Applicant: Infineon Technologies Austria AG, Villach (AT)

(72) Inventors: Osama Abdel-Rahman, Orlando, FL (US); Noureldeen Elsayad, Los Angeles, CA (US); Yalcin Haksoz, Redondo Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 199 days.

(21) Appl. No.: 17/892,556

(22) Filed: Aug. 22, 2022

(65) Prior Publication Data

US 2024/0063711 A1 Feb. 22, 2024

(51) Int. Cl.
*H02M 1/42* (2007.01)
*H02M 1/00* (2006.01)
(Continued)

(52) U.S. Cl.
CPC ....... *H02M 1/4233* (2013.01); *H02M 1/0067* (2021.05); *H02M 1/0096* (2021.05);
(Continued)

(58) Field of Classification Search
CPC .... H02M 1/4233; H02M 1/42; H02M 1/4225; H02M 1/0096; H02M 1/0067; H02M 7/217
See application file for complete search history.

(56) References Cited

U.S. PATENT DOCUMENTS

| | | | |
|---|---|---|---|
| 4,855,722 | A | 8/1989 | Mostyn et al. |
| 8,736,240 | B2 | 5/2014 | Liu et al. |
| | | (Continued) | |

FOREIGN PATENT DOCUMENTS

| | | |
|---|---|---|
| CN | 113131730 A | 7/2021 |
| JP | 2007053853 A | 3/2007 |

OTHER PUBLICATIONS

Kazimierczuk, Marian K., "Current-Mode Control", Chapter 13, Pulse-width Modulated DC-DC Power Converters, John Wiley & Sons, Ltd, 2008, pp. 511-570.

*Primary Examiner* — Alex Torres-Rivera
(74) *Attorney, Agent, or Firm* — Murphy, Bilak & Homiller, PLLC (57) ABSTRACT

A power factor correction (PFC) stage, controller, and control method are described. The PFC stage includes: a totem-pole converter having an input inductor for coupling to ac mains, first and second pairs of power switches, and an output capacitor for coupling to a bus; an auxiliary capacitor having a lower capacitance than the output capacitor; and a circuit configured to couple the auxiliary capacitor in parallel with the output capacitor in a first state and to the input inductor in a second state; and a controller. If a line drop out (LDO) condition is detected on the bus, the controller sets the circuit in the second state and operate the first pair of power switches as a DC-DC boost converter under peak current control. If no LDO condition is detected on the bus, the controller sets the circuit in the first state and operate the totem-pole converter under average current control.

21 Claims, 7 Drawing Sheets

(51) Int. Cl.
*H02M 7/217* (2006.01)
*H02M 3/158* (2006.01)

(52) U.S. Cl.
CPC ......... *H02M 1/4225* (2013.01); *H02M 7/217* (2013.01); *H02M 3/158* (2013.01)

(56) References Cited

U.S. PATENT DOCUMENTS

| | | |
|---|---|---|
| 10,338,658 B2 | 7/2019 | Hung et al. |
| 11,088,538 B2 | 8/2021 | Sun et al. |
| 2002/0071300 A1 | 6/2002 | Jang et al. |
| 2004/0156217 A1 | 8/2004 | Phadke |
| 2005/0030772 A1 | 2/2005 | Phadke |
| 2016/0181931 A1 | 6/2016 | Song et al. |
| 2016/0241132 A1* | 8/2016 | Lin ................... H02M 1/4225 |
| 2016/0359427 A1* | 12/2016 | Ghosh ................ H02M 1/4233 |
| 2019/0305671 A1* | 10/2019 | Matsuura ............. H02M 1/083 |
| 2020/0112243 A1 | 4/2020 | Dusmez |
| 2021/0126526 A1* | 4/2021 | Lin ..................... H02M 7/217 |
| 2024/0014731 A1* | 1/2024 | Chin ................... H02M 1/4233 |
| 2024/0014732 A1* | 1/2024 | Pohlmann ........... H02M 1/4233 |

\* cited by examiner

*FIG. 7B*

POWER FACTOR CORRECTION STAGE, CONTROLLER AND METHOD OF CONTROLLING A POWER FACTOR CORRECTION STAGE

BACKGROUND

Power levels and power density for SMPS (switched-mode power supply) continue to trend higher. The bulk capacitor at the PFC (power factor correction) stage output of a SMPS is sized to deliver full power for a specified hold-up time, e.g., 10 to 20 ms (milliseconds) during AC line drop out (LDO). The energy of the bulk capacitor is not fully utilized because the bulk capacitor voltage is only allowed to drop to a minimum voltage, e.g., 330V during LDO. This results in the bulk capacitor size being a significant share of the PFC stage, therefore limiting power density.

The bulk capacitor size may be reduced by lowering the allowed minimum voltage for the bulk capacitor to utilize more of the stored energy during LDO. However, this imposes a penalty on the following DC-DC stage such as an LLC converter, since a wide input voltage design translates to less optimization and lower efficiency. An auxiliary storage capacitor may be used and that is discharged during LDO by an additional conversion circuit to support the bus energy. However, this approach requires an additional inductor and switches.

Thus, there is a need for an improved SMPS having higher power density and low complexity.

SUMMARY

According to an embodiment of a power factor correction (PFC) stage, the PFC stage comprises: a totem-pole converter comprising an input inductor for coupling to ac mains, a first pair of power switches, a second pair of power switches, and an output capacitor for coupling to a bus; an auxiliary capacitor having a lower capacitance than the output capacitor; a circuit configured to couple the auxiliary capacitor in parallel with the output capacitor in a first state and to the input inductor in a second state; and a controller, wherein if a line drop out (LDO) condition is detected on the bus, the controller is configured to set the circuit in the second state and operate the first pair of power switches as a DC-DC boost converter under peak current control, wherein if no LDO condition is detected on the bus, the controller is configured to set the circuit in the first state and operate the totem-pole converter under average current control.

According to an embodiment of a controller for a PFC stage, the controller comprises: a first control loop configured to operate a totem-pole converter of the PFC stage under average current control, if no line drop out (LDO) condition is detected on a bus coupled to an output capacitor of the totem-pole converter; a second control loop configured to operate a first pair of power switches of the totem-pole converter as a DC-DC boost converter under peak current control, if an LDO condition is detected on the bus; and selection logic configured to set a circuit of the PFC stage in a first state in which the circuit couples an auxiliary capacitor of the PFC stage in parallel with an output capacitor of the PFC stage, if no LDO condition is detected on the bus, wherein the selection logic is configured to set the circuit of the PFC stage in a second state in which the circuit couples the auxiliary capacitor of the PFC stage to an input inductor of the totem-pole converter, if an LDO condition is detected on the bus.

According to an embodiment of a method of controlling a power factor correction (PFC) stage that includes a totem-pole converter having an input inductor for coupling to ac mains, a first pair of power switches, a second pair of power switches, and an output capacitor for coupling to a bus, an auxiliary capacitor having a lower capacitance than the output capacitor, and a circuit configured to couple the auxiliary capacitor in parallel with the output capacitor in a first state and to the input inductor in a second state, the method comprises: if a line drop out (LDO) condition is detected on the bus, setting the circuit of the PFC stage in the second state and operating the first pair of power switches as a DC-DC boost converter under peak current control; and if no LDO condition is detected on the bus, setting the circuit of the PFC stage in the first state and operating the totem-pole converter under average current control.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a power factor correction (PFC) stage, controller, and control method that utilize an auxiliary capacitor, where the primary converter circuit discharges the auxiliary capacitor energy to support and regulate the bus capacitor voltage during line drop out (LDO), thereby extending hold up time and reducing the bus capacitor size. In the case of a totem-pole converter as the primary converter circuit, the auxiliary capacitor is coupled to the input inductor of the totem-pole converter and a first pair of power switches of the totem-pole converter is operated as a DC-DC boost converter under peak current control if an LDO condition is detected on the bus. If no LDO condition is detected on the bus, the auxiliary capacitor is coupled in parallel with the output capacitor of the totem-pole converter and the totem-pole converter is operated under average current control.

Described next, with reference to the figures, are exemplary embodiments of the PFC stage, controller, and control method.

Figure 1:
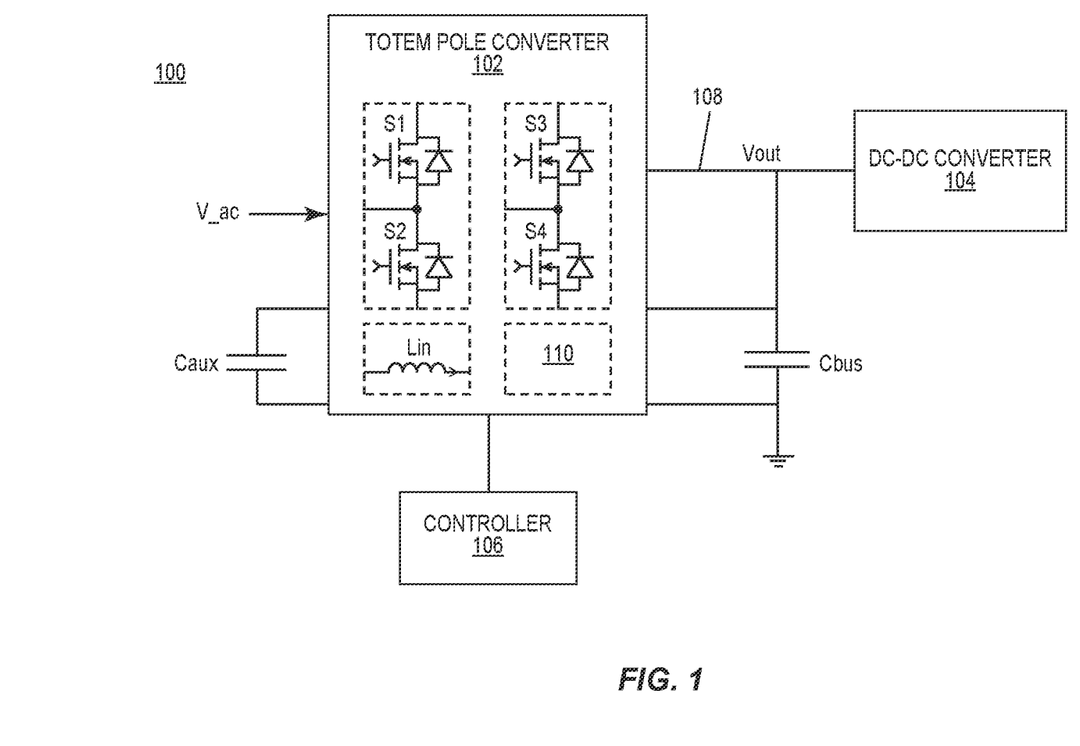
FIG. 1 illustrates a schematic diagram of an embodiment of a power factor correction (PFC) stage that includes a totem-pole converter.

FIG. 1 illustrates an embodiment of a PFC stage 100. The PFC stage 100 includes a totem-pole converter 102 that is also used as a DC-DC boost converter during LDO, a DC-DC converter 104 that regulates the output voltage Vout of the totem-pole converter 102, and a controller 106. The totem-pole converter 102 includes an input (boost) inductor Lin for coupling to ac mains V_ac, a first pair of power switches S1, S2, a second pair of power switches S3, S4, and an output capacitor Cbus for coupling to a bus 108. The controller 106 controls the totem-pole converter 102 during LDO and non-LDO operation. The same or different controller may be used to control the DC-DC converter 104. The PFC stage 100 delivers full power for a specified hold-up time, e.g., 10 to 20 ms (milliseconds) when LDO occurs, i.e., during AC line drop out.

The PFC stage 100 also includes an auxiliary capacitor Caux having a lower capacitance than the output capacitor Cbus and which provided power to the bus 108 during LDO. A circuit 110 included in or associated with the totem-pole converter 102 couples the auxiliary capacitor Caux in parallel with the output capacitor Cbus in a first state and to the input inductor Lin of the totem-pole converter 102 in a second state.

If an LDO condition is detected on the bus 108, the controller 106 sets the circuit 110 in the second state and operates the first pair of power switches S1, S2 of the totem-pole converter 102 as a DC-DC boost converter under peak current control. If no LDO condition is detected on the bus 108, the controller 106 sets the circuit 110 in the first state and operates the totem-pole converter 102 under average current control.

With this approach, the auxiliary capacitor Caux is decoupled from the bus 108 which is beneficial because the output capacitor Cbus is constrained by the voltage drop on the bus 108 since the DC-DC converter 104 may have a limited regulation range. For example, the DC-DC converter 104 may not operate at low voltages, e.g., 200V because of the efficiency penalty. The minimum voltage of the bus 108 is typically 330V, for example. The smaller auxiliary capacitor Caux stores energy for LDO events and is coupled in parallel with the output capacitor Cbus during normal (non-LDO) operation.

The totem-pole converter 102 functions as a DC-DC boost converter during an LDO event. When an LDO condition is detected on the bus 108, the totem-pole converter 102 may discharge the auxiliary capacitor Caux deeper, e.g., down to 250V, 200V, 150V, etc. The totem-pole converter 102, when functioning as a DC-DC boost converter, may regulate the bus voltage Vout during an LDO event using a much smaller auxiliary capacitor Caux, which can be 40% to 50% smaller than a conventional auxiliary capacitor.

During an LDO event, the totem-pole converter 102, when operated as a DC-DC boost converter, starts switching at a decreased bus voltage level, e.g., 370V compared to 400V non-LDO bus voltage, and maintains bus regulation so that the bus voltage level does not drop further. The totem-pole converter 102, when operated as a DC-DC boost converter, transfers energy from the auxiliary capacitor Caux to the bus 108 via the input inductor Lin and first pair of power switches S1, S2. The auxiliary capacitor Caux is recharged by the totem-pole converter 102 during normal (non-LDO) operation.

Figure 2:
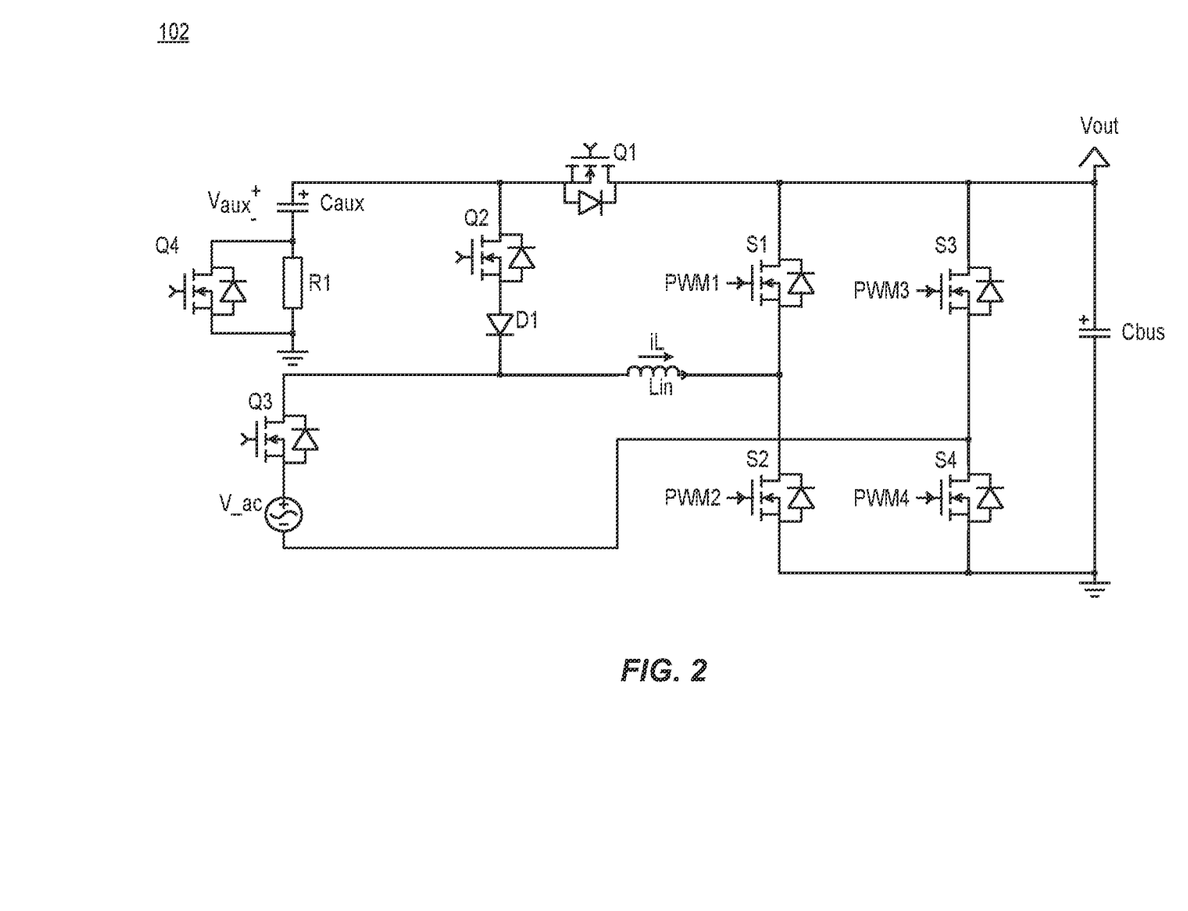
FIG. 2 illustrates a circuit schematic of an embodiment of the totem-pole converter.

FIG. 2 illustrates an embodiment of the totem-pole converter 102. In FIG. 2, the totem-pole converter 102 has two (2) legs/phases S1/S2, S3/S4 configured to deliver current to the bus 108. Each leg/phase S1/S2, S3/S4 includes a series-connected high side (HS) switch S1, S3 and low side (LS) switch S2, S4 coupled in parallel with the output capacitor Cbus. The leg/phase switches S1, S2, S3, S4 are illustrated as power MOSFETs (metal-oxide-semiconductor field-effect transistors) with a freewheeling diode in FIG. 2. Any suitable power transistors may be used for the leg/phase switches S1, S2, S3, S4 such as but not limited to Si or SiC power MOSFETs, IGBTs (insulated gate bipolar transistors), HEMTs (high-electron mobility transistors), etc. The first leg/phase S1/S2 may be switched at a higher frequency than the second leg/phase S3/S4. The switches S1, S2 of the higher frequency leg/phase S1/S2 may be GaN or SiC switches and the switches S3, S4 of the lower frequency leg/phase S3/S4 may be Si switches, for example.

The first (primary) leg/phase S1/S2 of the totem-pole converter 102 is enabled for all load current conditions. Accordingly, the first leg/phase S1/S2 is enabled under the complete load range. The second leg/phase S3/S4 may be enabled only under heavier load conditions and disabled under light load conditions. The totem-pole converter 102 is shown with two (2) legs/phases S1/S2, S3/S4 in FIG. 2. However, the totem-pole converter 102 may have one or more additional legs/phases.

The controller 106 includes digital circuitry such as a modulator like a PFM (pulse frequency modulator) for controlling the individual leg/phase switches S1, S2, S3, S4 of the totem-pole converter 102 via respective PWM signals PWM1, PWM2, PWM3, PWM4. The switches S1, S2 of the first leg/phase S1/S2 may be operated at a PWM frequency for voltage step-up and therefore function as a boost device. The switches S3, S4 of the second leg/phase S3/S4 may be operated at line frequency for voltage rectification and therefore function as rectifiers. The output capacitor Cbus supports the boosting operation.

FIG. 2 illustrates an embodiment of the circuit 110 that couples the auxiliary capacitor Caux in parallel with the output capacitor Cbus in the first (non-LDO) state and to the input inductor Lin of the totem-pole converter 102 in the second (LDO) state. According to this embodiment, the circuit 110 includes a first switch Q1 coupling a positive terminal ('+') of the auxiliary capacitor Caux to a positive terminal of the output capacitor Cbus. A second switch Q2 of the circuit 110 couples the positive terminal of the auxiliary capacitor Caux to the input inductor Lin, e.g., through a diode Dl. A third switch Q3 of the circuit 110 couples the input inductor Lin to the ac mains input V_ac. The switches Q1, Q2, Q3 of the circuit 110 are illustrated as power MOSFETs with a freewheeling diode in FIG. 2. Any suitable transistors may be used for the switches Q1, Q2, Q3 of the circuit 110 such as but not limited to Si or SiC power MOSFETs, IGBTs, HEMTs, etc.

Figure 3A:
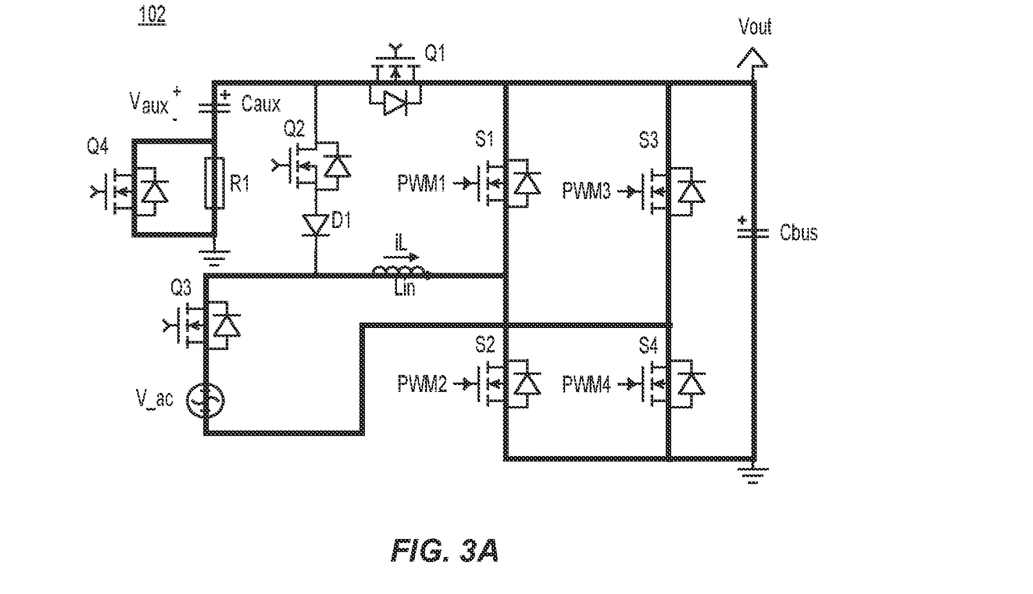
FIG. 3A illustrates the totem-pole converter schematic of FIG. 2 in a first state when no line drop out (LDO) condition is detected.
Figure 3B:
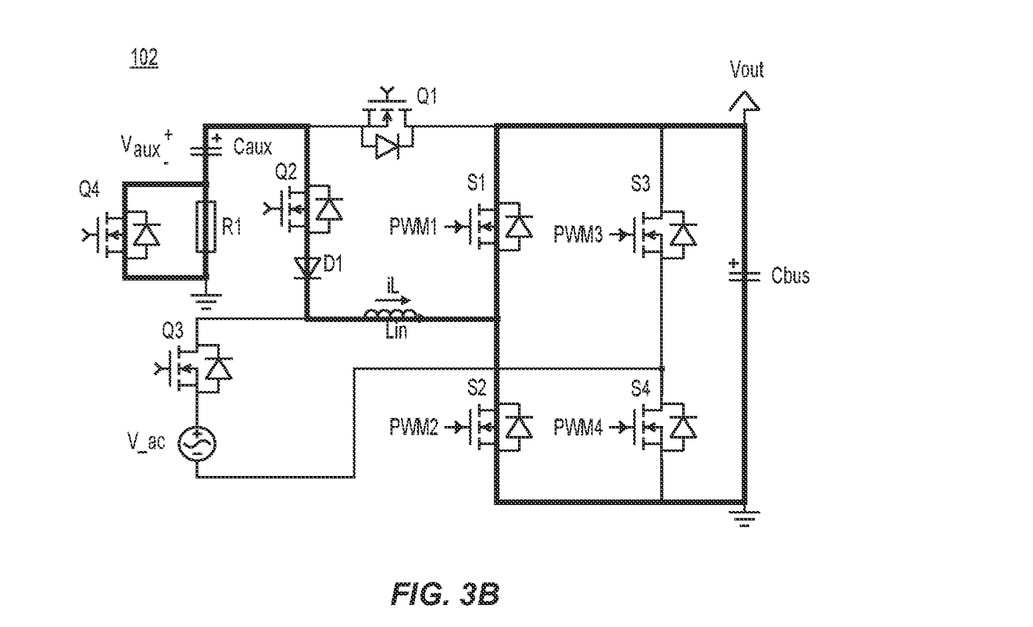
FIG. 3B illustrates the totem-pole converter schematic of FIG. 2 in a second state when an LDO condition is detected.

FIG. 3A shows the totem-pole converter 102 embodiment of FIG. 2 configured in the first state when no LDO condition is detected on the bus 108. FIG. 3B shows the totem-pole converter 102 embodiment of FIG. 2 configured in the second state when an LDO condition is detected on the bus 108. FIGS. 3A and 3B use different weight lines to distinguish between the PFC stage components that are included (heavier weight lines) in the converter loop and those that are excluded (lighter weight lines) from the converter loop during non-LDO (FIG. 3A) and LDO (FIG. 3B) operation.

The controller 106 sets the circuit 110 in the first (non-LDO) state (FIG. 3A) by closing both the first switch Q1 and the third switch Q3 via a control signal 'AC_OFF' and opening the second switch Q2 via an inverted version of the control signal AC_OFF. The controller 106 sets the circuit 110 in the second (LDO) state (FIG. 3B) by closing the second switch Q2 and opening both the first switch Q1 and the third switch Q3, via the same control signal AC_OFF but with the opposite waveform/polarity.

During normal (non-LDO) operation, the controller 106 turns on the first switch Q1 of the circuit 110 such that the auxiliary capacitor Caux is coupled in parallel with the output capacitor Cbus and the converter functions as a standard totem-pole converter. During an LDO event, the controller 106 turns off the first switch Q1 of the circuit 110 such that the auxiliary capacitor Caux is no longer in parallel with the output capacitor Cbus. The controller 106 also turns on the second switch Q2 of the circuit 110 such that the auxiliary capacitor Caux is coupled to the input inductor Lin of the totem-pole converter 102. The auxiliary capacitor Caux discharges onto the bus 108 through the input inductor Lin and first leg/phase S1/S2 of the totem-pole converter 102 which operates as a DC-DC boost converter during LDO.

As shown in FIG. 3B, the controller 106 operates the high-frequency leg/phase S1/S2 of the totem-pole converter 102 during LDO and which acts like a synchronous converter with the input inductor Lin to charge the output capacitor Cbus. Accordingly, an additional inductor is not needed to charge the output capacitor Cbus during LDO. The third switch Q3 of the circuit 110, which is in series with the AC mains input V_ac, is turned off by the controller 106 during LDO to prevent energy from being pushed onto the AC mains line. During LDO, the controller 106 operates the totem-pole converter 102 as a DC-DC boost converter using just the high-frequency leg/phase S1/S2 such that energy from the auxiliary capacitor Caux is discharged by the DC-DC boost converter to support the main bus 108 during LDO hold up, thereby limiting the bus voltage drop and extending the hold up time (e.g., 10 to 20 ms).

The circuit 110 that couples the auxiliary capacitor Caux in parallel with the output capacitor Cbus in the first (non-LDO) state and to the input inductor Lin of the totem-pole converter 102 in the second (LDO) state may also include an inrush current limiting resistor R1 such as an NTC (negative temperature coefficient) resistor that couples the negative terminal ('−') of the auxiliary capacitor Caux to ground. A fourth switch Q4 of the circuit 110 is coupled in parallel with the inrush current limiting resistor R1.

During an LDO event, the totem-pole converter 102 regulates the bus voltage Vout at a decreased level, e.g., 370V compared to 400V non-LDO bus voltage. The auxiliary capacitor Caux discharges to a certain level, e.g., 250V. When exiting LDO mode, the auxiliary capacitor Caux is recharged but preferably switch Q1 is not continuously on during recharging of the auxiliary capacitor. Instead, the controller 106 may pulse switch Q1 on and off to recharge the auxiliary capacitor Caux in smaller steps, e.g., like a trickle charge. The controller 106 turns switch Q4 on later to limit the inrush current. The inrush current limiting resistor R1 also helps to limit inrush current. When the auxiliary capacitor Caux is charged to a target level, e.g., 400V, the controller 106 turns on switch Q4 which shorts the inrush current limiting resistor R1 to improve efficiency.

Figure 4:
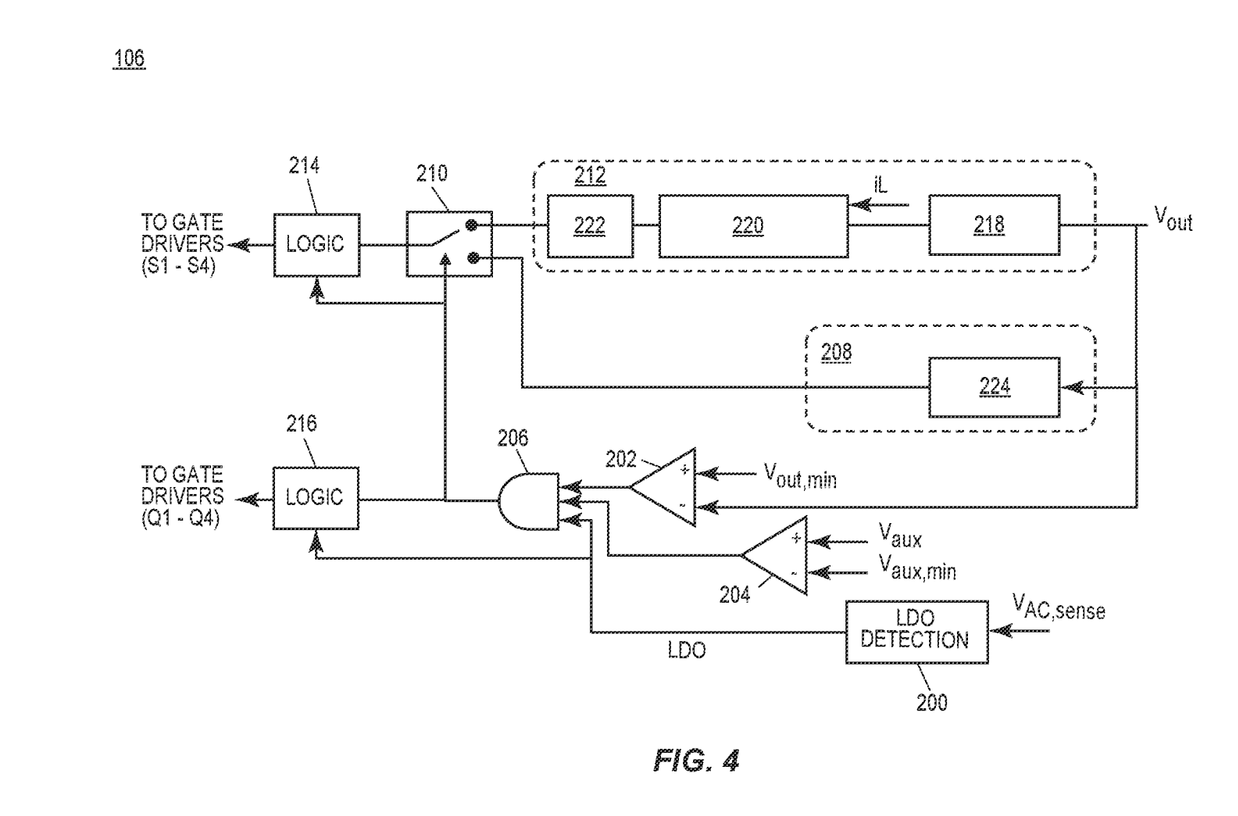
FIG. 4 illustrates a block diagram of an embodiment of a controller for the totem-pole converter.
Figure 5:
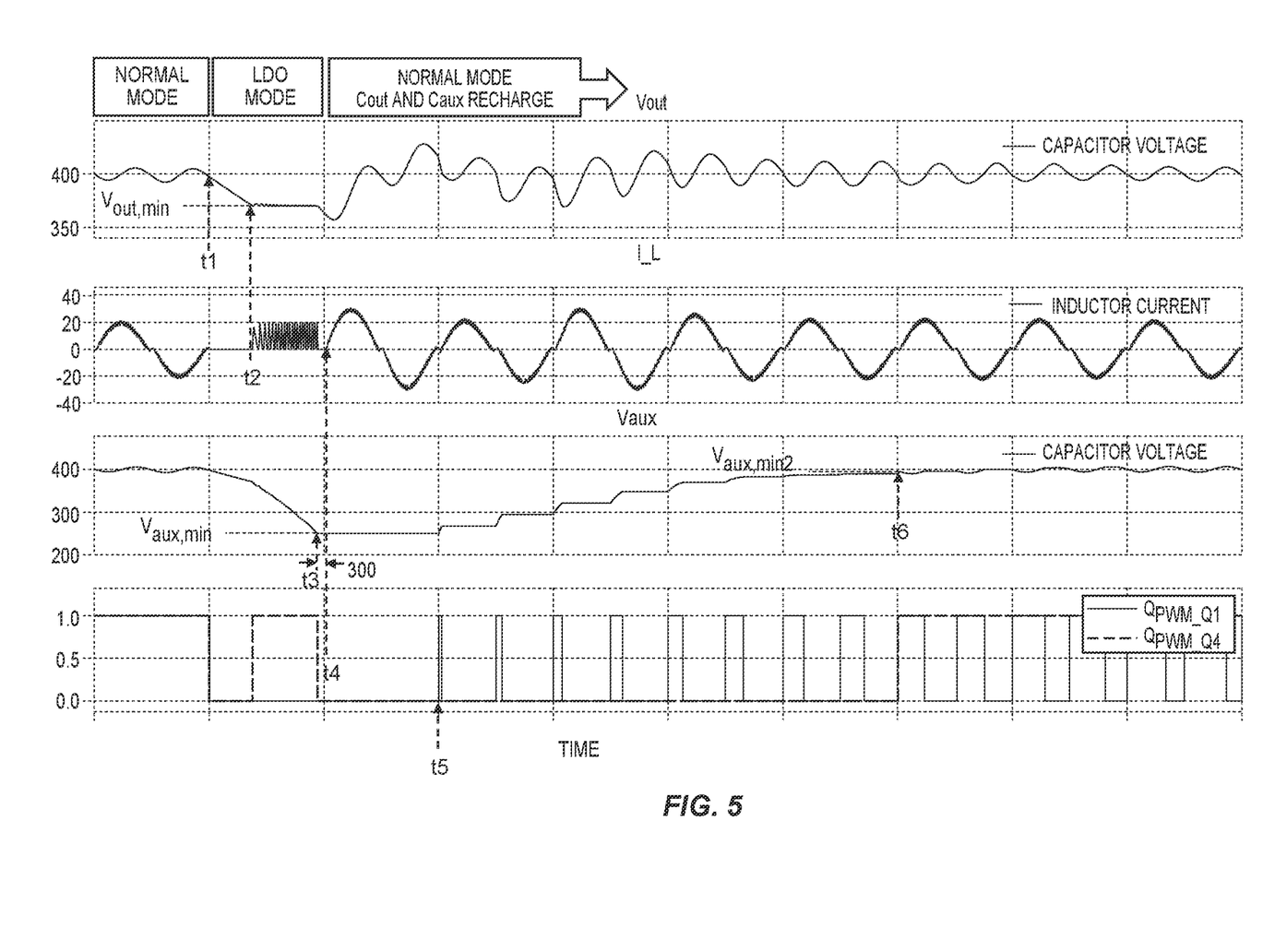
FIG. 5 illustrates respective waveform diagrams associated with operation of the totem-pole converter in both normal (non-LDO) mode and during LDO.

FIG. 4 illustrates an embodiment of the controller 106. FIG. 5 illustrates the inductor current iL, the voltage Vout of the output capacitor Cbus, and the voltage Vaux of the auxiliary capacitor Caux in both normal (no LDO) mode and during LDO.

According to the embodiment illustrated in FIG. 4, the controller 106 includes LDO detection logic 200, a first comparator 202, a second comparator 204, and selection logic 206. In FIG. 5, the LDO detection logic 200 detects an LDO condition on the bus 108 at time t1, e.g., based on a sensed bus voltage $V_{AC,sense}$.

The first comparator 202 indicates if the voltage Vout of the output capacitor Cbus drops below a first threshold $V_{out,min}$ during a detected LDO condition. In FIG. 5, $V_{out,min}$ is 370V as an example and the first comparator 202 indicates Vout<$V_{out,min}$ at time t2. More generally, $V_{out,min}$ is the voltage level to which Vout must drop to initiate boost switching during LDO.

The second comparator 204 indicates if the voltage Vaux of the auxiliary capacitor Caux drops below a second threshold $V_{aux,min}$ during a detected LDO condition. In FIG. 5, $V_{aux,min}$ is 250V as an example and the second comparator 204 indicates Vaux<$V_{aux,min}$ at time t3. More generally, $V_{aux,min}$ is the voltage level of the auxiliary capacitor Caux at which LDO boosting is stopped. In other examples, $V_{aux,min}$ may be 200V, 150V, etc.

From the time the LDO detection logic 200 detects an LDO event (t1 in FIG. 5) until Vout drops below $V_{out,min}$ (time t2 in FIG. 5), the inductor current iL is zero and the output Vout drops linearly. When Vout drops below $V_{out,min}$ (time t2 in FIG. 5), as indicated by the first comparator 202, and if the second comparator 204 indicates Vaux $V_{aux,min}$, the selection logic 206 sets the circuit 110 in the second (LDO) state and selects a second loop 208 of the controller 106 via a signal switch/selector 210 such as a multiplexor. The second control loop 208 operates the first (high frequency) pair of power switches S1, S2 of the totem-pole converter 102 as a DC-DC boost converter under peak current control. During DC-DC boost converter operation, the inductor current iL periodically rises and the output voltage Vout is stabilized (at 370V in this example). The boosting energy is provided by the auxiliary capacitor Caux, which causes Vaux to drop.

During the detected LDO condition, and if the second comparator 204 indicates Vaux drops below $V_{aux,min}$ (time t3 in FIG. 5), the selection logic 206 selects a first loop 212 of the controller 106 via the signal switch/selector 210. The first control loop 212 operates the totem-pole converter 102 under average current control. However, until the ac mains input V_ac returns (time t4 in FIG. 5), Vout begins to drop again and the inductor current iL is zero during this phase 300 of operation.

The selection logic 206 controls the boost switching based on these thresholds $V_{out,min}$, $V_{aux,min}$ and may be implemented as a logic AND gate, e.g., as shown in FIG. 4. For example, the selection logic 206 may close the second switch Q2 of the PFC stage circuit 110 and open both the first switch Q1 and the third switch Q3 of the PFC stage circuit 110, to set the circuit 110 of the PFC stage 100 in the second (LDO) state. Conversely, the selection logic 206 may close both the first switch Q1 and the third switch Q3 of the PFC stage circuit 110 and open the second switch Q2 of the PFC stage circuit 110, to set the circuit 110 of the PFC stage 100 in the first (non-LDO) state.

If the circuit 110 of the PFC stage 100 includes the inrush current limiting resistor R1 and the fourth switch Q4 in parallel with the inrush current limiting resistor R1, e.g., as shown in FIG. 2, the selection logic 206 may open the fourth switch Q4 of the PFC stage circuit 110 and select the first control loop 212 for controlling the totem-pole converter 102 in average current control if Vaux drops below $V_{aux,min}$ during an LDO event.

The totem-pole converter 102 recovers both the voltage Vout of the output capacitor Cout and the voltage Vaux of the auxiliary capacitor Caux when the ac mains V_ac recovers, as shown in FIG. 5. The totem-pole converter 102 charges Vout to its reference point (e.g., 400V) over a few line cycles. The voltage Vaux of the auxiliary capacitor Caux recharges from the output capacitor Cout.

The controller 106 controls the charge transfer to avoid destructive high inrush current. In response to the ac mains V_ac recovering from the LDO event, the selection logic 206 closes the first switch Q1 of the PFC stage circuit 110 in a pulsed manner with increasing duty cycle and closes the fourth switch Q4 of the PFC stage circuit 110 when the voltage Vaux of the auxiliary capacitor Caux rises to a second auxiliary voltage threshold $V_{aux,min}2>V_{aux,min}$. This feature is illustrated in FIG. 5, which shows the logic signal PWM Q1 used to generate the gate drive signal for the first switch Q1 of the PFC stage circuit 110 and the logic signal PWM Q4 used to generate the gate drive signal for the fourth switch Q4 of the PFC stage circuit 110.

If the voltage Vaux of the auxiliary capacitor Caux drops below the first auxiliary voltage threshold $V_{aux,min}$ during an LDO event, the controller 106 may open the fourth switch Q4 of the PFC stage circuit 110 and change operation of the totem-pole converter from the peak current control to the average current control. This is shown in FIG. 5, where the logic signal PWM Q4 is deactivated at time t3 (logic zero level in this example) to open the fourth switch Q4. In response to the ac mains recovering from the LDO event (time t4 in FIG. 5), the controller 106 closes the first switch Q1 of the PFC stage circuit 110 in a pulsed manner with increasing duty cycle at, e.g., twice the line frequency. The controller 106 also closes the fourth switch Q4 of the PFC stage circuit 110 when the voltage Vaux of the auxiliary capacitor Caux rises to the second auxiliary voltage threshold $V_{aux,min2}$ (time t6 in FIG. 5). This is shown in FIG. 5, where the logic signal PWM Q1 begins to pulse at time t5 and has increasing duty cycle each successive pulse and the logic signal PWM Q4 is activated at time t6 (logic high level in this example) to close the fourth switch Q4. This approach limits inrush current to the auxiliary capacitor Caux and limits voltage undershoot at the output capacitor Cout. The voltage Vaux of the auxiliary capacitor Caux steps up with each pulse of switch Q1 until Vaux approaches Vout. When Vaux approaches Vout (t6 in FIG. 5), the controller 106 can turn on the inrush limit switch Q4 as the totem-pole converter 102 continues normal operation, to improve converter efficiency by bypassing the inrush current limiting resistor R1.

The controller 106 may include first logic 214 for generating logic signals provided to the gate drivers for the totem-pole converter switches S1, S2, S3, S4 and second logic 216 for generating logic signals provided to the gate drivers for the switches Q1, Q2, Q3, Q4 of the PFC stage circuit 110. The gate drivers (not shown) convert the respective logic signals to sufficiently strong gate drive signals for driving the gates of the PFC switches S1, S2, S3, S4, Q1, Q2, Q3, Q4.

The first control loop 212 of the controller 106 may include a voltage controller 218, average current control unit 220, and a PWM 222 for implementing a standard totem-pole converter in normal (no LDO) mode. The voltage controller 218 compares the output voltage Vout with a reference voltage Vref to determine an error that is processed to provide a reference current. The average current control unit 220 compares the average current to the reference current. The PWM 222 processes the current error to generate the corresponding PWM PWM1, PWM2, PWM3, PWM4 for the legs/phases S1/S2, S3/S4 of the totem-pole converter 102.

The second control loop 208 of the controller 106 may include a voltage controller 224 for implementing a DC-DC boost converter during LDO. The voltage controller 224 compares the output voltage Vout with a reference voltage Vref to determine an error that is processed to provide a reference current and compares the reference current with the actual current flowing into the inductor Lin. Slope compensation may be performed, and the comparison determines when the active portion of the PWM period is turned off. Both control loops 208, 212 of the controller 106 may be partly or fully implemented in firmware, for example.

Figure 6:
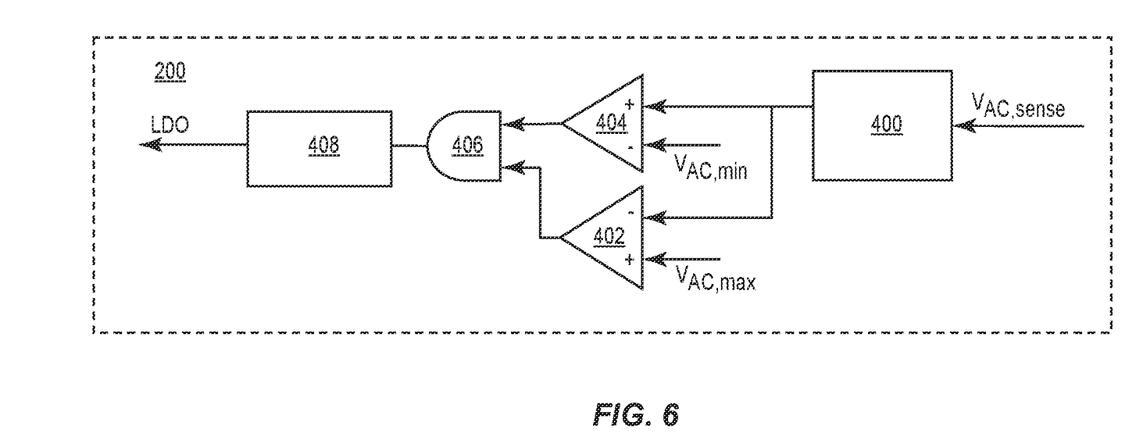
FIG. 6 illustrates a block diagram of an embodiment of LDO detection logic included in the controller for the totem-pole converter.

FIG. 6 illustrates an embodiment of the LDO detection logic 200 included in the controller 106. According to this embodiment, the LDO detection logic 200 includes a moving average filter 400 having an input that corresponds to a sensed voltage $V_{AC,sense}$ at the input inductor Lin. The moving average filter 400 filters out any current spikes, especially near the zero crossing. A first comparator 402 compares the output of the moving average filter 200 to a maximum voltage threshold $V_{AC,max}$. A second comparator 404 compares the output of the moving average filter 200 to a minimum voltage threshold $V_{AC,min}$. A logic gate 406 such as an AND gate combines the output of the first comparator 402 and the output of the second comparator 404. A pulse blanking circuit 408 applies a blanking pulse to the output of the logic gate 406. The controller 106 detect an LDO condition on the bus 108 based on the output of the pulse blanking circuit 408.

During LDO, the sensed voltage $V_{AC,sense}$ at the input inductor Lin stays within the narrow window (e.g., +1V and −1V for $V_{AC,max}$ and $V_{AC,min}$) defined by the first and second comparators 402, 404. Both comparators 402, 404 have a high output, and the logic gate 406 correspondingly has a high output. In normal (no LDO) mode, the output of the logic gate 406 is low except for a short high pulse that occurs near the zero crossing. The pulse blanking circuit 408 eliminates/masks the short pulse, preventing false LDO detection.

Figure 7A:
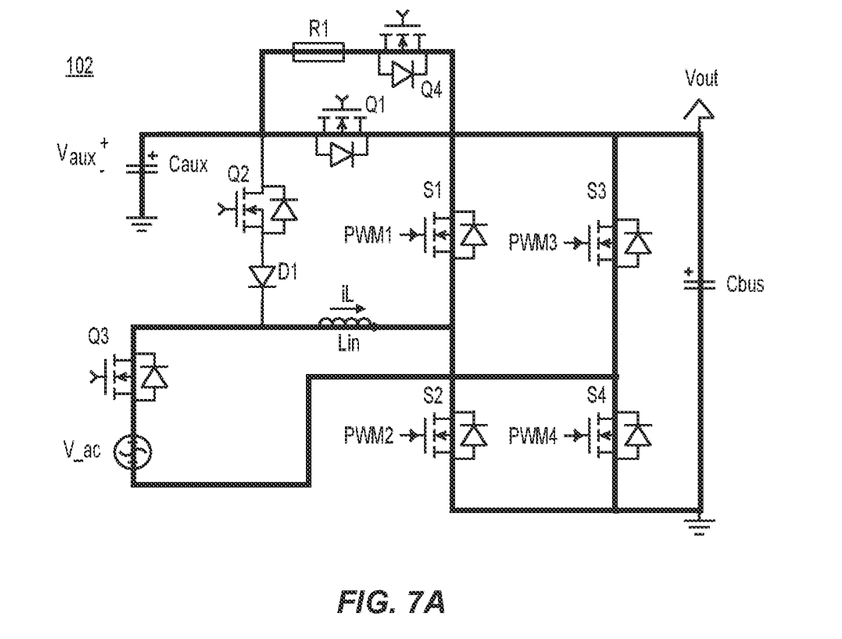
FIG. 7A illustrates the totem-pole converter schematic of FIG. 2 in a first state when no line drop out (LDO) condition is detected, according to another embodiment.
Figure 7B:
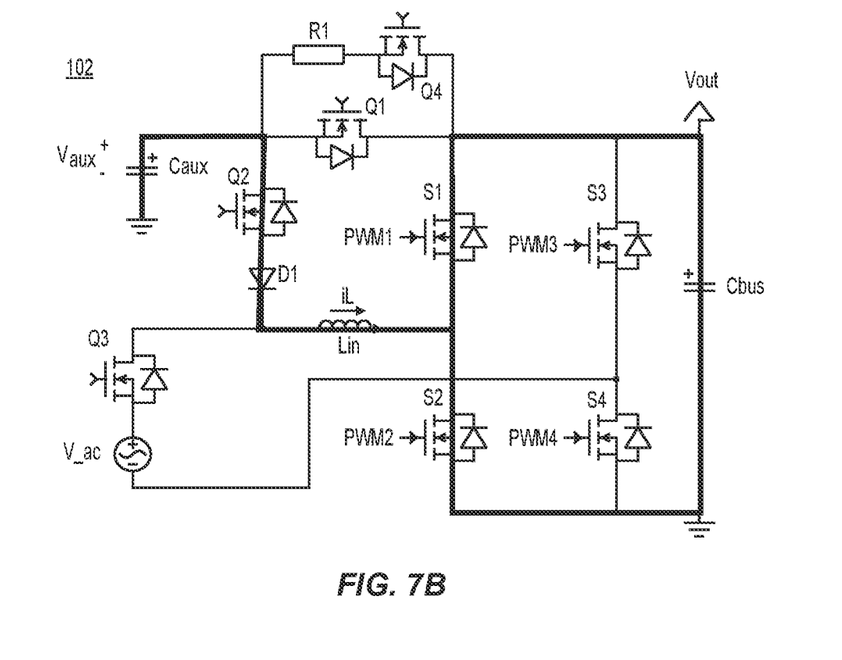
FIG. 7B illustrates the totem-pole converter schematic of FIG. 2 in a second state when an LDO condition is detected, according to another embodiment.

FIGS. 7A and 7B illustrate another embodiment of the totem-pole converter 102 shown in FIG. 2. FIG. 7A shows the totem-pole converter 102 embodiment of FIG. 2 configured in the first state when no LDO condition is detected on the bus 108. FIG. 7B shows the totem-pole converter 102 embodiment of FIG. 2 configured in the second state when an LDO condition is detected on the bus 108. FIGS. 7A and 7B use different weight lines to distinguish between the PFC stage components that are included (heavier weight lines) in the converter loop and those that are excluded (lighter weight lines) from the converter loop during non-LDO (FIG. 3A) and LDO (FIG. 3B) operation.

The embodiment shown in FIGS. 7A and 7B is similar to the embodiment shown in FIGS. 3A and 3B. In FIGS. 7A and 7B, the inrush current limiting circuit, which includes the inrush current limiting resistor R1 in series with switch Q4, is coupled in parallel with first switch Q1 of circuit 110. This configuration has the advantage of reducing conduction losses during normal operation, as current from the auxiliary capacitor Caux effectively passes through a single switch (Q1 and Q4 in parallel) instead of two switches in series (Q1 and Q4 in series).

Although the present disclosure is not so limited, the following numbered examples demonstrate one or more aspects of the disclosure.

Example 1

A power factor correction (PFC) stage, comprising: a totem-pole converter comprising an input inductor for coupling to ac mains, a first pair of power switches, a second pair of power switches, and an output capacitor for coupling to a bus; an auxiliary capacitor having a lower capacitance than the output capacitor; a circuit configured to couple the auxiliary capacitor in parallel with the output capacitor in a first state and to the input inductor in a second state; and a controller, wherein if a line drop out (LDO) condition is detected on the bus, the controller is configured to set the circuit in the second state and operate the first pair of power switches as a DC-DC boost converter under peak current control, wherein if no LDO condition is detected on the bus, the controller is configured to set the circuit in the first state and operate the totem-pole converter under average current control.

Example 2

The PFC stage of example 1, wherein the circuit comprises: a first switch coupling a positive terminal of the auxiliary capacitor to a positive terminal of the output capacitor; a second switch coupling the positive terminal of the auxiliary capacitor to the input inductor; and a third switch coupling the input inductor to the ac mains.

Example 3

The PFC stage of example 2, wherein the controller is configured to set the circuit in the second state by closing the second switch and opening both the first switch and the third switch, and wherein the controller is configured to set the circuit in the first state by closing both the first switch and the third switch and opening the second switch.

Example 4

The PFC stage of example 3, wherein the circuit further comprises: an inrush current limiting resistor coupling a negative terminal of the auxiliary capacitor to ground; and a fourth switch in parallel with the inrush current limiting resistor.

Example 5

The PFC stage of example 4, wherein if the voltage of the auxiliary capacitor drops below a first auxiliary voltage threshold during an LDO event, the controller is configured to open the fourth switch and change operation of the totem-pole converter from the peak current control to the average current control, and wherein in response to the ac mains recovering from the LDO event, the controller is configured to close the first switch in a pulsed manner with increasing duty cycle and close the fourth switch when the voltage of the auxiliary capacitor rises to a second auxiliary voltage threshold.

Example 6

The PFC stage of example 3, wherein the circuit further comprises: a series connected inrush current limiting resistor and fourth switch coupled in parallel with the first switch.

Example 7

The PFC stage of example 6, wherein if the voltage of the auxiliary capacitor drops below a first auxiliary voltage threshold during an LDO event, the controller is configured to open the fourth switch and change operation of the totem-pole converter from the peak current control to the average current control, and wherein in response to the ac mains recovering from the LDO event, the controller is configured to close the first switch in a pulsed manner with increasing duty cycle and close the fourth switch when the voltage of the auxiliary capacitor rises to a second auxiliary voltage threshold.

Example 8

The PFC stage of any of examples 1 through 7, wherein the controller comprises: LDO detection logic configured to detect an LDO condition on the bus; a first comparator configured to indicate if the voltage of the output capacitor drops below a first threshold during the detected LDO condition; a second comparator configured to indicate if the voltage of the auxiliary capacitor drops below a second threshold during the detected LDO condition; and selection logic, wherein in response to detection of the LDO condition, and if both the first comparator indicates the voltage of the output capacitor is below the first threshold and the second comparator indicates the voltage of the auxiliary capacitor is at or above the second threshold, the selection logic is configured to set the circuit in the second state and select a second loop of the controller that operates the first pair of power switches as a DC-DC boost converter under peak current control, wherein during the detected LDO condition, and if the second comparator indicates the voltage of the auxiliary capacitor drops below the second threshold, the selection logic is configured to select a first loop of the controller that operates the totem-pole converter under average current control.

Example 9

The PFC stage of any of examples 1 through 8, wherein the controller comprises: a moving average filter having an input that corresponds to a sensed voltage at the input inductor; a first comparator configured to compare an output of the moving average filter to a maximum voltage threshold; a second comparator configured to compare the output of the moving average filter to a minimum voltage threshold; a logic gate configured to combine an output of the first comparator and an output of the second comparator; and a pulse blanking circuit configured to apply a blanking pulse to an output of the logic gate, wherein the controller is configured to detect an LDO condition on the bus based on an output of the pulse blanking circuit.

Example 10

A controller for a power factor correction (PFC) stage, the controller comprising: a first control loop configured to operate a totem-pole converter of the PFC stage under average current control, if no line drop out (LDO) condition is detected on a bus coupled to an output capacitor of the totem-pole converter; a second control loop configured to operate a first pair of power switches of the totem-pole converter as a DC-DC boost converter under peak current control, if an LDO condition is detected on the bus; and selection logic configured to set a circuit of the PFC stage in a first state in which the circuit couples an auxiliary capacitor of the PFC stage in parallel with an output capacitor of the PFC stage, if no LDO condition is detected on the bus, wherein the selection logic is configured to set the circuit of the PFC stage in a second state in which the circuit couples the auxiliary capacitor of the PFC stage to an input inductor of the totem-pole converter, if an LDO condition is detected on the bus.

Example 11

The controller of example 10, wherein: the circuit of the PFC stage comprises a first switch coupling a positive terminal of the auxiliary capacitor to a positive terminal of the output capacitor, a second switch coupling the positive terminal of the auxiliary capacitor to the input inductor of the totem-pole converter, and a third switch coupling the input inductor of the totem-pole converter to the ac mains; the selection logic is configured to close the second switch of the PFC stage and open both the first switch and the third switch of the PFC stage, to set the circuit of the PFC stage in the second state; and the selection logic is configured to close both the first switch and the third switch of the PFC stage and open the second switch of the PFC stage, to set the circuit of the PFC stage in the first state.

Example 12

The controller of example 11, wherein: the circuit of the PFC stage further comprises an inrush current limiting resistor coupling a negative terminal of the auxiliary capacitor to ground, and a fourth switch in parallel with the inrush current limiting resistor; if the voltage of the auxiliary capacitor drops below a first auxiliary voltage threshold during an LDO event, the selection logic is configured to open the fourth switch of the PFC stage and select the first control loop for controlling the totem-pole converter in average current control; and in response to the ac mains recovering from the LDO event, the selection logic is configured to close the first switch of the PFC stage in a pulsed manner with increasing duty cycle and close the fourth switch of the PFC stage when the voltage of the auxiliary capacitor rises to a second auxiliary voltage threshold.

Example 13

The controller of example 11, wherein: the circuit of the PFC stage further comprises a series connected inrush current limiting resistor and fourth switch coupled in parallel with the first switch; if the voltage of the auxiliary capacitor drops below a first auxiliary voltage threshold during an LDO event, the selection logic is configured to open the fourth switch of the PFC stage and select the first control loop for controlling the totem-pole converter in average current control; and in response to the ac mains recovering from the LDO event, the selection logic is configured to close the first switch of the PFC stage in a pulsed manner with increasing duty cycle and close the fourth switch of the PFC stage when the voltage of the auxiliary capacitor rises to a second auxiliary voltage threshold.

Example 14

The controller of any of examples 10 through 13, further comprising: LDO detection logic configured to detect an LDO condition on the bus; a first comparator configured to indicate if the voltage of the output capacitor drops below a first threshold during the detected LDO condition; and a second comparator configured to indicate if the voltage of the auxiliary capacitor drops below a second threshold during the detected LDO condition, wherein in response to detection of the LDO condition, and if both the first comparator indicates the voltage of the output capacitor is below the first threshold and the second comparator indicates the voltage of the auxiliary capacitor is at or above the second threshold, the selection logic is configured to set the circuit of the PFC stage in the second state and select the second control loop that operates the first pair of power switches of the totem-pole converter as a DC-DC boost converter under peak current control, wherein during the detected LDO condition, and if the second comparator indicates the voltage of the auxiliary capacitor drops below the second threshold, the selection logic is configured to select the first control loop that operates the totem-pole converter under average current control.

Example 15

The controller of any of examples 10 through 14, further comprising: a moving average filter having an input that corresponds to a sensed voltage at the input inductor of the totem-pole converter; a first comparator configured to compare an output of the moving average filter to a maximum voltage threshold; a second comparator configured to compare the output of the moving average filter to a minimum voltage threshold; a logic gate configured to combine an output of the first comparator and an output of the second comparator; and a pulse blanking circuit configured to apply a blanking pulse to an output of the logic gate, wherein the controller is configured to detect an LDO condition on the bus based on an output of the pulse blanking circuit.

Example 16

A method of controlling a power factor correction (PFC) stage that includes a totem-pole converter having an input inductor for coupling to ac mains, a first pair of power switches, a second pair of power switches, and an output capacitor for coupling to a bus, an auxiliary capacitor having a lower capacitance than the output capacitor, and a circuit configured to couple the auxiliary capacitor in parallel with the output capacitor in a first state and to the input inductor in a second state, the method comprising: if a line drop out (LDO) condition is detected on the bus, setting the circuit of the PFC stage in the second state and operating the first pair of power switches as a DC-DC boost converter under peak current control; and if no LDO condition is detected on the bus, setting the circuit of the PFC stage in the first state and operating the totem-pole converter under average current control.

Example 17

The method of example 16, wherein the circuit of the PFC stage comprises a first switch coupling a positive terminal of the auxiliary capacitor to a positive terminal of the output capacitor, a second switch coupling the positive terminal of the auxiliary capacitor to the input inductor, and a third switch coupling the input inductor to the ac mains, wherein setting the circuit of the PFC stage in the second state comprises closing the second switch and opening both the first switch and the third switch, and wherein setting the circuit of the PFC stage in the first state comprises closing both the first switch and the third switch and opening the second switch.

Example 18

The method of example 17, wherein the circuit of the PFC stage further comprises an inrush current limiting resistor coupling a negative terminal of the auxiliary capacitor to ground and a fourth switch in parallel with the inrush current limiting resistor, the method further comprising: if the voltage of the auxiliary capacitor drops below a first auxiliary voltage threshold during an LDO event, opening the fourth switch and changing operation of the totem-pole converter from the peak current control to the average current control; and in response to the ac mains recovering from the LDO event, closing the first switch in a pulsed manner with increasing duty cycle and closing the fourth switch when the voltage of the auxiliary capacitor rises to a second auxiliary voltage threshold.

Example 19

The method of example 17, wherein the circuit of the PFC stage further comprises a series connected inrush current limiting resistor and fourth switch coupled in parallel with the first switch, the method further comprising: if the voltage of the auxiliary capacitor drops below a first auxiliary voltage threshold during an LDO event, opening the fourth switch and changing operation of the totem-pole converter from the peak current control to the average current control; and in response to the ac mains recovering from the LDO event, closing the first switch in a pulsed manner with increasing duty cycle and closing the fourth switch when the voltage of the auxiliary capacitor rises to a second auxiliary voltage threshold.

Example 20

The method of any of examples 16 through 19, further comprising: detecting an LDO condition on the bus; indicating if the voltage of the output capacitor drops below a first threshold during the detected LDO condition; indicating if the voltage of the auxiliary capacitor drops below a second threshold during the detected LDO condition; in response to detection of the LDO condition, and if both the voltage of the output capacitor is below the first threshold and the voltage of the auxiliary capacitor is at or above the second threshold, setting the circuit of the PFC stage in the second state and selecting a second loop of the controller that operates the first pair of power switches of the totem-pole converter as a DC-DC boost converter under peak current control, wherein during the detected LDO condition, and if the voltage of the auxiliary capacitor drops below the second threshold, selecting a first loop of the controller of the PFC stage that operates the totem-pole converter of the PFC stage under average current control.

Example 21

The method of any of examples 16 through 20, further comprising: applying a moving average filter to a sensed voltage at the input inductor of the totem-pole converter; comparing an output of the moving average filter to a maximum voltage threshold using a first comparator; comparing the output of the moving average filter to a minimum voltage threshold using a second comparator; combining an output of the first comparator and an output of the second comparator to generate a combined signal; apply a blanking pulse to the combined signal to generate a pulse blanked signal; and detecting an LDO condition on the bus based on the pulse blanked signal.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power factor correction (PFC) stage, comprising:
a totem-pole converter comprising an input inductor for coupling to ac mains, a first pair of power switches, a second pair of power switches, and an output capacitor for coupling to a bus;
an auxiliary capacitor having a lower capacitance than the output capacitor;
a circuit configured to couple the auxiliary capacitor in parallel with the output capacitor in a first state and to the input inductor in a second state; and
a controller,
wherein if a line drop out (LDO) condition is detected on the bus, the controller is configured to set the circuit in the second state and operate the first pair of power switches as a DC-DC boost converter under peak current control,
wherein if no LDO condition is detected on the bus, the controller is configured to set the circuit in the first state and operate the totem-pole converter under average current control.

2. The PFC stage of claim 1, wherein the circuit comprises:
a first switch coupling a positive terminal of the auxiliary capacitor to a positive terminal of the output capacitor;
a second switch coupling the positive terminal of the auxiliary capacitor to the input inductor; and
a third switch coupling the input inductor to the ac mains.

3. The PFC stage of claim 2, wherein the controller is configured to set the circuit in the second state by closing the second switch and opening both the first switch and the third switch, and wherein the controller is configured to set the circuit in the first state by closing both the first switch and the third switch and opening the second switch.

4. The PFC stage of claim 3, wherein the circuit further comprises:
an inrush current limiting resistor coupling a negative terminal of the auxiliary capacitor to ground; and
a fourth switch in parallel with the inrush current limiting resistor.

5. The PFC stage of claim 4, wherein if the voltage of the auxiliary capacitor drops below a first auxiliary voltage threshold during an LDO event, the controller is configured to open the fourth switch and change operation of the totem-pole converter from the peak current control to the average current control, and wherein in response to the ac mains recovering from the LDO event, the controller is configured to close the first switch in a pulsed manner with increasing duty cycle and close the fourth switch when the voltage of the auxiliary capacitor rises to a second auxiliary voltage threshold.

6. The PFC stage of claim 3, wherein the circuit further comprises:
a series connected inrush current limiting resistor and fourth switch coupled in parallel with the first switch.

7. The PFC stage of claim 6, wherein if the voltage of the auxiliary capacitor drops below a first auxiliary voltage threshold during an LDO event, the controller is configured to open the fourth switch and change operation of the totem-pole converter from the peak current control to the average current control, and wherein in response to the ac mains recovering from the LDO event, the controller is configured to close the first switch in a pulsed manner with increasing duty cycle and close the fourth switch when the voltage of the auxiliary capacitor rises to a second auxiliary voltage threshold.

8. The PFC stage of claim 1, wherein the controller comprises:
LDO detection logic configured to detect the LDO condition on the bus;
a first comparator configured to indicate if the voltage of the output capacitor drops below a first threshold during the detected LDO condition;
a second comparator configured to indicate if the voltage of the auxiliary capacitor drops below a second threshold during the detected LDO condition; and
selection logic,
wherein in response to detection of the LDO condition, and if both the first comparator indicates the voltage of the output capacitor is below the first threshold and the second comparator indicates the voltage of the auxiliary capacitor is at or above the second threshold, the selection logic is configured to set the circuit in the second state and select a second loop of the controller that operates the first pair of power switches as a DC-DC boost converter under peak current control,
wherein during the detected LDO condition, and if the second comparator indicates the voltage of the auxiliary capacitor drops below the second threshold, the selection logic is configured to select a first loop of the controller that operates the totem-pole converter under average current control.

9. The PFC stage of claim 1, wherein the controller comprises:
a moving average filter having an input that corresponds to a sensed voltage at the input inductor;
a first comparator configured to compare an output of the moving average filter to a maximum voltage threshold;
a second comparator configured to compare the output of the moving average filter to a minimum voltage threshold;
a logic gate configured to combine an output of the first comparator and an output of the second comparator; and
a pulse blanking circuit configured to apply a blanking pulse to an output of the logic gate,
wherein the controller is configured to detect the LDO condition on the bus based on an output of the pulse blanking circuit.

10. A controller for a power factor correction (PFC) stage, the controller comprising:
a first control loop configured to operate a totem-pole converter of the PFC stage under average current control, if no line drop out (LDO) condition is detected on a bus coupled to an output capacitor of the totem-pole converter;
a second control loop configured to operate a first pair of power switches of the totem-pole converter as a DC-DC boost converter under peak current control, if the LDO condition is detected on the bus; and
selection logic configured to set a circuit of the PFC stage in a first state in which the circuit couples an auxiliary capacitor of the PFC stage in parallel with an output capacitor of the PFC stage, if no LDO condition is detected on the bus,
wherein the selection logic is configured to set the circuit of the PFC stage in a second state in which the circuit couples the auxiliary capacitor of the PFC stage to an input inductor of the totem-pole converter, if the LDO condition is detected on the bus.

11. The controller of claim 10, wherein:
the circuit of the PFC stage comprises a first switch coupling a positive terminal of the auxiliary capacitor to a positive terminal of the output capacitor, a second switch coupling the positive terminal of the auxiliary capacitor to the input inductor of the totem-pole converter, and a third switch coupling the input inductor of the totem-pole converter to the ac mains;
the selection logic is configured to close the second switch of the PFC stage and open both the first switch and the third switch of the PFC stage, to set the circuit of the PFC stage in the second state; and
the selection logic is configured to close both the first switch and the third switch of the PFC stage and open the second switch of the PFC stage, to set the circuit of the PFC stage in the first state.

12. The controller of claim 11, wherein:
the circuit of the PFC stage further comprises an inrush current limiting resistor coupling a negative terminal of the auxiliary capacitor to ground, and a fourth switch in parallel with the inrush current limiting resistor;
if the voltage of the auxiliary capacitor drops below a first auxiliary voltage threshold during an LDO event, the selection logic is configured to open the fourth switch of the PFC stage and select the first control loop for controlling the totem-pole converter in average current control; and
in response to the ac mains recovering from the LDO event, the selection logic is configured to close the first switch of the PFC stage in a pulsed manner with increasing duty cycle and close the fourth switch of the PFC stage when the voltage of the auxiliary capacitor rises to a second auxiliary voltage threshold.

13. The controller of claim 11, wherein:
the circuit of the PFC stage further comprises a series connected inrush current limiting resistor and fourth switch coupled in parallel with the first switch;
if the voltage of the auxiliary capacitor drops below a first auxiliary voltage threshold during an LDO event, the selection logic is configured to open the fourth switch of the PFC stage and select the first control loop for controlling the totem-pole converter in average current control; and
in response to the ac mains recovering from the LDO event, the selection logic is configured to close the first switch of the PFC stage in a pulsed manner with increasing duty cycle and close the fourth switch of the PFC stage when the voltage of the auxiliary capacitor rises to a second auxiliary voltage threshold.

14. The controller of claim 10, further comprising:
LDO detection logic configured to detect the LDO condition on the bus;
a first comparator configured to indicate if the voltage of the output capacitor drops below a first threshold during the detected LDO condition; and
a second comparator configured to indicate if the voltage of the auxiliary capacitor drops below a second threshold during the detected LDO condition,
wherein in response to detection of the LDO condition, and if both the first comparator indicates the voltage of the output capacitor is below the first threshold and the second comparator indicates the voltage of the auxiliary capacitor is at or above the second threshold, the selection logic is configured to set the circuit of the PFC stage in the second state and select the second control loop that operates the first pair of power switches of the totem-pole converter as a DC-DC boost converter under peak current control,
wherein during the detected LDO condition, and if the second comparator indicates the voltage of the auxiliary capacitor drops below the second threshold, the selection logic is configured to select the first control loop that operates the totem-pole converter under average current control.

15. The controller of claim 10, further comprising:
a moving average filter having an input that corresponds to a sensed voltage at the input inductor of the totem-pole converter;
a first comparator configured to compare an output of the moving average filter to a maximum voltage threshold;
a second comparator configured to compare the output of the moving average filter to a minimum voltage threshold;
a logic gate configured to combine an output of the first comparator and an output of the second comparator; and
a pulse blanking circuit configured to apply a blanking pulse to an output of the logic gate,
wherein the controller is configured to detect the LDO condition on the bus based on an output of the pulse blanking circuit.

16. A method of controlling a power factor correction (PFC) stage that includes a totem-pole converter having an input inductor for coupling to ac mains, a first pair of power switches, a second pair of power switches, and an output capacitor for coupling to a bus, an auxiliary capacitor having a lower capacitance than the output capacitor, and a circuit configured to couple the auxiliary capacitor in parallel with the output capacitor in a first state and to the input inductor in a second state, the method comprising:
if a line drop out (LDO) condition is detected on the bus, setting the circuit of the PFC stage in the second state and operating the first pair of power switches as a DC-DC boost converter under peak current control; and
if no LDO condition is detected on the bus, setting the circuit of the PFC stage in the first state and operating the totem-pole converter under average current control.

17. The method of claim 16, wherein the circuit of the PFC stage comprises a first switch coupling a positive terminal of the auxiliary capacitor to a positive terminal of the output capacitor, a second switch coupling the positive terminal of the auxiliary capacitor to the input inductor, and a third switch coupling the input inductor to the ac mains, wherein setting the circuit of the PFC stage in the second state comprises closing the second switch and opening both the first switch and the third switch, and wherein setting the circuit of the PFC stage in the first state comprises closing both the first switch and the third switch and opening the second switch.

18. The method of claim 17, wherein the circuit of the PFC stage further comprises an inrush current limiting resistor coupling a negative terminal of the auxiliary capacitor to ground and a fourth switch in parallel with the inrush current limiting resistor, the method further comprising:
if the voltage of the auxiliary capacitor drops below a first auxiliary voltage threshold during an LDO event, opening the fourth switch and changing operation of the totem-pole converter from the peak current control to the average current control; and
in response to the ac mains recovering from the LDO event, closing the first switch in a pulsed manner with increasing duty cycle and closing the fourth switch when the voltage of the auxiliary capacitor rises to a second auxiliary voltage threshold.

19. The method of claim 17, wherein the circuit of the PFC stage further comprises a series connected inrush current limiting resistor and fourth switch coupled in parallel with the first switch, the method further comprising:
if the voltage of the auxiliary capacitor drops below a first auxiliary voltage threshold during an LDO event, opening the fourth switch and changing operation of the totem-pole converter from the peak current control to the average current control; and
in response to the ac mains recovering from the LDO event, closing the first switch in a pulsed manner with increasing duty cycle and closing the fourth switch when the voltage of the auxiliary capacitor rises to a second auxiliary voltage threshold.

20. The method of claim 16, further comprising:
detecting the LDO condition on the bus;
indicating if the voltage of the output capacitor drops below a first threshold during the detected LDO condition;
indicating if the voltage of the auxiliary capacitor drops below a second threshold during the detected LDO condition;
in response to detection of the LDO condition, and if both the voltage of the output capacitor is below the first threshold and the voltage of the auxiliary capacitor is at or above the second threshold, setting the circuit of the PFC stage in the second state and selecting a second loop of the controller that operates the first pair of power switches of the totem-pole converter as a DC-DC boost converter under peak current control,
wherein during the detected LDO condition, and if the voltage of the auxiliary capacitor drops below the second threshold, selecting a first loop of the controller of the PFC stage that operates the totem-pole converter of the PFC stage under average current control.

21. The method of claim 16, further comprising:
applying a moving average filter to a sensed voltage at the input inductor of the totem-pole converter;
comparing an output of the moving average filter to a maximum voltage threshold using a first comparator;
comparing the output of the moving average filter to a minimum voltage threshold using a second comparator;
combining an output of the first comparator and an output of the second comparator to generate a combined signal;
apply a blanking pulse to the combined signal to generate a pulse blanked signal; and
detecting the LDO condition on the bus based on the pulse blanked signal.

* * * * *

UNITED STATES PATENT AND TRADEMARK OFFICE
CERTIFICATE OF CORRECTION

| | | |
|---|---|---|
| PATENT NO. | : 12,126,257 B2 | Page 1 of 1 |
| APPLICATION NO. | : 17/892556 | |
| DATED | : October 22, 2024 | |
| INVENTOR(S) | : O. Abdel-Rahman et al. | |

It is certified that error appears in the above-identified patent and that said Letters Patent is hereby corrected as shown below:

On the Title Page

Item (57) abstract, Lines 11 and 14, please change "operate" to -- operates --.

Signed and Sealed this
Twenty-first Day of January, 2025

Coke Morgan Stewart
*Acting Director of the United States Patent and Trademark Office*